US006823480B1

(12) United States Patent
Brown

(10) Patent No.: US 6,823,480 B1
(45) Date of Patent: Nov. 23, 2004

(54) OPERATIONAL STATUS IDENTIFICATION SYSTEM FOR A MODEM OR OTHER COMMUNICATION SYSTEM

(75) Inventor: Larry Cecil Brown, Westfield, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 606 days.

(21) Appl. No.: 09/669,215

(22) Filed: Sep. 25, 2000

Related U.S. Application Data

(60) Provisional application No. 60/169,132, filed on Dec. 6, 1999.

(51) Int. Cl.[7] ............................................... G06F 11/00
(52) U.S. Cl. ......................................................... 714/44
(58) Field of Search ............................................ 714/44

(56) References Cited

U.S. PATENT DOCUMENTS

| | | | | |
|---|---|---|---|---|
| 4,390,947 A | | 6/1983 | DeShon ....................... 364/200 |
| 4,677,686 A | | 6/1987 | Hustig et al. ................... 455/5 |
| 4,710,929 A | * | 12/1987 | Kelly et al. ..................... 379/28 |
| 5,202,914 A | * | 4/1993 | Kim et al. ............. 379/106.03 |
| 5,455,933 A | * | 10/1995 | Schieve et al. ............... 714/27 |
| 5,961,604 A | | 10/1999 | Anderson et al. ........... 709/229 |
| 6,014,744 A | * | 1/2000 | McKaughan et al. ........... 713/2 |
| 6,041,051 A | | 3/2000 | Doshi et al. |
| 6,049,826 A | | 4/2000 | Beser ........................... 709/222 |
| 6,230,326 B1 | * | 5/2001 | Unger et al. ................. 725/111 |
| 6,366,297 B1 | * | 4/2002 | Feagans ...................... 345/736 |

OTHER PUBLICATIONS

ACM6000EB Cable Modem User's Manual, 2000, ASUSTeK Computer Inc., pp. 1–16.*
Hotwire 6310 MVL Modem Customer Premises Installation Instructions, Document No. 6310–A2–GN10–40, Feb. 2000 Paradyne Corporation, pp. 1–20.*

M. St. Johns, Ed, *DOCSIS Cable Device MIB Cable Device Management Information Base for DOCSIS compliant Cable Modems and Cable Modem Termination System*, Aug., 1999, pp. 1–55.

Y. Rekhter, B. Moskowitz, D. Karrenberg, G. deGroot & E. Lear, *Address Allocation for Private Internets*, Feb., 1996, pp. 1–8.

AT&T Wireless Services Wireless Data Division *Minstrel Wireless IP Modem Setup and Configuration Guide for the Palm Pilot*, pp. 1–22.

Barco Communication Systems, *Achieving Accurate Network Monitoring the Cable Environment to Improve the Level of Service and Reliability*, pp. 1–15.

* cited by examiner

*Primary Examiner*—Robert Beausoliel
*Assistant Examiner*—Michael Maskulinski
(74) *Attorney, Agent, or Firm*—Joseph S. Tripoli; Ronald H. Kurdyla; Guy H. Eriksen

(57) ABSTRACT

Processing functions in a communication device are partitioned into a sequence of operational levels having corresponding status indications which are captured prior to a fault or other abnormal condition and retained during re-cycling of the sequence of operations for use in status monitoring or fault diagnosis. In a modem performing a sequence of operations including groups of one or more individual operations having an associated status indication, a method is used for capturing an indication of system status. The method involves generating hierarchically ordered status indications reflecting the status of completion of sequentially performed groups of operations in which individual status indications are associated with corresponding groups of operations. The generated status indications are captured and retained following initiation of repetition of the groups of operations and are provided as identification of an attained operational status of the system for operation diagnosis (e.g., by display using LEDs).

19 Claims, 6 Drawing Sheets

| KEY | | CM | CABLE MODEM |
|---|---|---|---|
| ○ OFF  ● ON  ✕ FLASHING | | CMTS | CABLE MODEM TERMINATION SYSTEM |
| | | DOCSIS | DATA OVER CABLE SERVICE INTFCE SPEC. |
| | | DHCP | DYNAMIC HOST CONFIGURATION PROTOCOL |
| | | DS | DOWNSTREAM |
| | | LED | LIGHT EMITTING DIODE |
| | | TFTP | TRIVIAL FILE TRANSFER PROTOCOL |
| | | TIME | INTERNET TIME PROTOCOL |
| | | US | UPSTREAM |

| INDICATOR | DOCSIS EVENTS | STATE | SIGNIFICANCE WHEN COMPLETED | |
|---|---|---|---|---|
| 1 ✕, 2 ○, 3 ○, 4 ○, 5 ○  LED 1 FLASHING | • FIND DS CM CHANNEL<br>• LEARN SYSTEM TIMING | TUNING | CM OPERATIONAL<br>DS CMTS & CABLE<br>PLANT OPERATIONAL | 300 |
| LEDs 1,2 FLASHING | • LEARN US CHANNELS<br>• LEARN US TRANSMISSION TIMES<br>• ITERATE US TRANSMISSION LEVEL TO TARGET | RANGING | CM OPERATIONAL<br>DS CMTS & CABLE PLANT OPERATIONAL<br>US CMTS & CABLE PLANT OPERATIONAL | 305 |
| LEDs 1,2,3 FLASHING | • GET INFO FROM DHCP SERVER | CONNECTING | CM OPERATIONAL<br>DS CMTS & CABLE PLANT OPERATIONAL<br>US CMTS & CABLE PLANT OPERATIONAL<br>DHCP PROCESS FUNCTIONAL | 310 |
| LEDs 1,2,3,4 FLASHING | • GET DATE/TIME<br>• GET CONFIGURATION FILE | CONFIGURING | CM OPERATIONAL<br>DS CMTS & CABLE PLANT OPERATIONAL<br>US CMTS & CABLE PLANT OPERATIONAL<br>DHCP PROCESS FUNCTIONAL<br>TIME PROCESS FUNCTIONAL<br>TFTP, CONFIG FILE PROCESSES FUNCTIONAL | 315 |
| LEDs 1,2,3,4,5 FLASHING | • REPORT "AS-CONFIGURED"<br>• GET ON-LINE GO-AHEAD | REGISTERING | CM OPERATIONAL<br>DS CMTS & CABLE PLANT OPERATIONAL<br>US CMTS & CABLE PLANT OPERATIONAL<br>DHCP PROCESS FUNCTIONAL<br>TIME PROCESS FUNCTIONAL<br>TFTP, CONFIG FILE PROCESSES FUNCTIONAL<br>REGISTRATION COMPLETED; CM ON-LINE | 320 |
| LEDs 1,2,3 ON STEADY | • BECOME "ON-LINE"<br>• FORWARD DATA TO USER PC(S) | ON-LINE | | 325 |

TIME ↓

FIG. 3

OPERATIONAL STATUS IDENTIFICATION SYSTEM FOR A MODEM OR OTHER COMMUNICATION SYSTEM

This is a non-provisional application of provisional application Ser. No. 60/169,132 by L. C. Brown, filed Dec. 6, 1999.

FIELD OF THE INVENTION

This invention concerns a system for use in an interactive bi-directional communication device such as a cable modem, computer, TV, VCR, or an associated peripheral device.

BACKGROUND OF THE INVENTION

Home entertainment systems increasingly include both Personal Computer and television functions (PC/TV functions) involving multiple source and multiple destination communication. Such a system may receive data from satellite or terrestrial sources comprising High Definition Television (HDTV) broadcasts, Microwave Multi-point Distribution System (MMDS) broadcasts and Digital Video Broadcasts (DVB). Such a system may also provide high speed Internet access through a broadcast link or a coaxial link (e.g. cable TV lines) using a cable modem or via a telephone line link using an ADSL or ISDN (Asynchronous Digital Subscriber Line or Integrated Services Digital Network) compatible modem, for example. A home entertainment system may also communicate with local devices using different communication networks. Such local devices include Digital Video Disk (DVD), CDROM, VHS, and Digital VHS (DVHS™) type players, PCs, set top boxes and many other types of devices.

It is desirable for Internet compatible bi-directional communication systems that are used in conjunction with home entertainment systems to incorporate diagnostic capabilities sufficient to support in-home fault diagnosis and status identification. It is also desirable for cable and other modems and peripheral devices to support flexible information retrieval and interchange. These requirements and associated problems are addressed by a system according to the present invention.

SUMMARY OF THE INVENTION

Initialization (or other processing) functions in a communication device (e.g., a cable modem), are partitioned into a sequence of operational levels having corresponding status indications which are captured prior to a fault or other abnormal condition and retained during re-cycling of initialization for use in fault or operation analysis. In a modem performing a sequence of operations including groups of one or more individual operations (e.g. tuning, configuring etc.) having an associated status indication, a method is used for capturing an indication of system status. The method involves generating hierarchically ordered status indications reflecting the status of completion of sequentially performed groups of operations in which individual status indications are associated with corresponding groups of operations. The generated status indications are captured and retained following initiation of repetition of the groups of operations and are provided as identification of an attained operational status of the system for operation diagnosis (e.g., by display using LEDs).

BRIEF DESCRIPTION OF THE DRAWINGS

In the drawing:

FIG. 3 shows a cable modem start up sequence and associated visual indication mechanism, according to the invention.

DETAILED DESCRIPTION OF THE DRAWINGS

Figure 1:
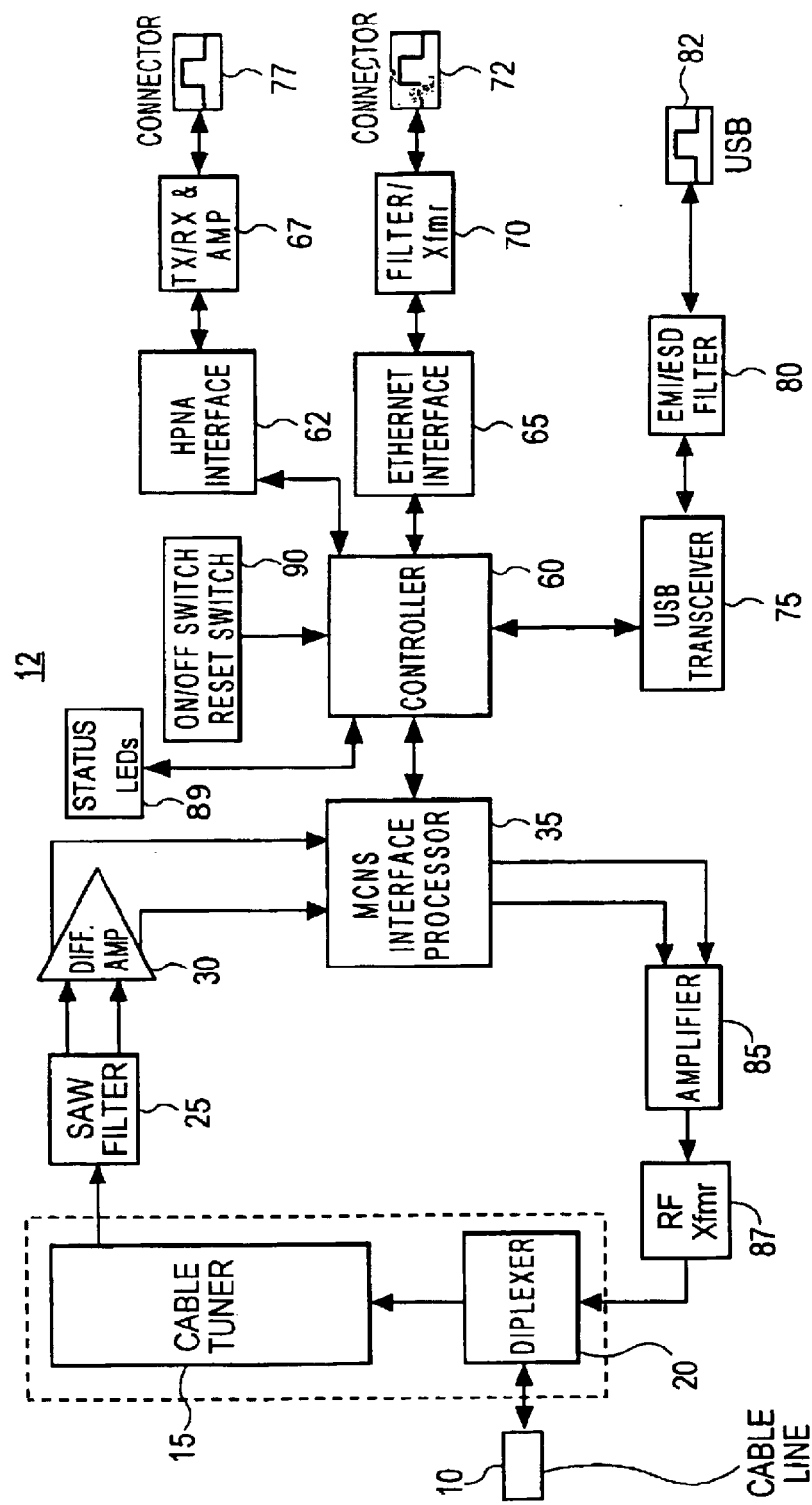
FIG. 1 shows a block diagram of a cable modem incorporating operational status diagnostic capability, according to the invention.

FIG. 1 shows a block diagram of a cable modem (e.g., Data Over Cable Service Interface Specification—DOCSIS standard compliant modem) incorporating operational status diagnostic capability for bi-directional Internet communication. The cable modem provides a communication bridge between a cable TV system and a PC (or another device such as a TV), for example. The modem implements DOCSIS compatible functions and communicates with the cable system head end via SNMP (System Network Management Protocol). The cable modem initialization functions are advantageously partitioned into a hierarchical sequence of operational levels with individual levels including one or more distinct operations and having associated LED status indications. The status indications identify the completed or highest operational status attained during an initialization sequence prior to interruption by a fault or other abnormal condition and are used in combination for fault finding and problem diagnosis by a field technician. Status indications for the operational levels prior to a fault or other abnormal condition are advantageously captured and communicated by visual or other means for use in fault or operation analysis. The status indications are also captured and retained in a removable or other storage medium to be available during re-cycling of the initialization, processing or diagnostic operational sequence.

The exemplary embodiment of FIG. 1 supports cable modem communication and decoding of data in hierarchically arranged protocols including TCP/IP (Transmission Control Protocol/Internet Protocol), Ethernet and MPEG (Motion Picture Experts Group) protocols (e.g. per MPEG2 ISO/IEC 13818-1 of 10th Jun. 1994, and ISO/IEC 13818-2, of 20th Jan. 1995). In addition, the system of FIG. 1 is compatible with the Multimedia Cable Networks Systems (MCNS) preliminary requirements and DOCSIS 1.0 (Data Over Cable Service Interface Specification 1.0) requirements ratified by the International Telecommunications Union (ITU) March 1998 and as specified in RFC 2669 (Request For Comment Document 2669). The RFC documents are available via the Internet and are prepared by Internet standards working groups.

The principles of the invention may be applied to any bi-directional communication system and are not restricted to cable, ADSL, ISDN or conventional type modems. Further, the disclosed system processes internet Protocol (IP) data from a variety of Internet sources including streamed video or audio data, telephone messages, computer programs, Emails or other packetized data and communications, for example.

The cable modem (system 12) of FIG. 1 communicates with a CATV head-end over a bi-directional broadband high speed RF link on line 10 which typically consists of coaxial cable or hybrid fiber/coax (HFC). The modem system 12 bi-directionally communicates with devices located at a User site over local area networks (LANs). Typical User-side local area networks include Digital/Intel/Xerox Ethernet compatible networks attached via connector 72. Other User-side devices communicate via a Universal Serial Bus (USB) or HPNA compatible networks attached via connectors 82 and 77 respectively. User devices attached on the Ethernet, HPNA and USB networks may include equipment such as personal computers (PCs), network printers, video receivers, audio receivers, VCRs, DVDs, scanners, copiers, telephones, fax machines and home appliances, for example.

In operation, diplexer 20 of cable modem system 12 of FIG. 1 separates upstream communications (sent from modem 12 to a CATV head-end) from downstream communications (sent from a CATV head-end to modem 12) conveyed via cable line 10. Diplexer 20 separates upstream data from downstream data based on the different frequency ranges that the upstream data (typically 5–42 MHz) and downstream data (typically 88–860 MHz) respectively employ. Controller 60 configures the elements of cable modem 12 of FIG. 1 to receive MPEG2 transport data from the CATV head-end on cable line 10 and to convert the data to Ethernet, USB or HPNA compatible format for output via ports 72, 82 and 77 respectively. Similarly, controller 60 configures the elements of cable modem 12 of FIG. 1 to receive Ethernet, USB or HPNA compatible data from ports 72, 82 and 77 and to convert and transmit MPEG2 transport protocol data to the CATV head-end on cable line 10. Controller 60 configures the elements of system 12 through the setting of control register values within these elements using a bi-directional data and control signal bus. Specifically, controller 60 configures tuner 15, saw filter 25, differential amplifier 30 and MCNS (Multimedia Cable Networks Systems) interface device 35 to receive a DOCSIS formatted signal on a previously identified RF channel frequency. The DOCSIS formatted signal comprises an MPEG2 transport protocol format conveying Ethernet compatible data frames including IP data content.

Figure 2:
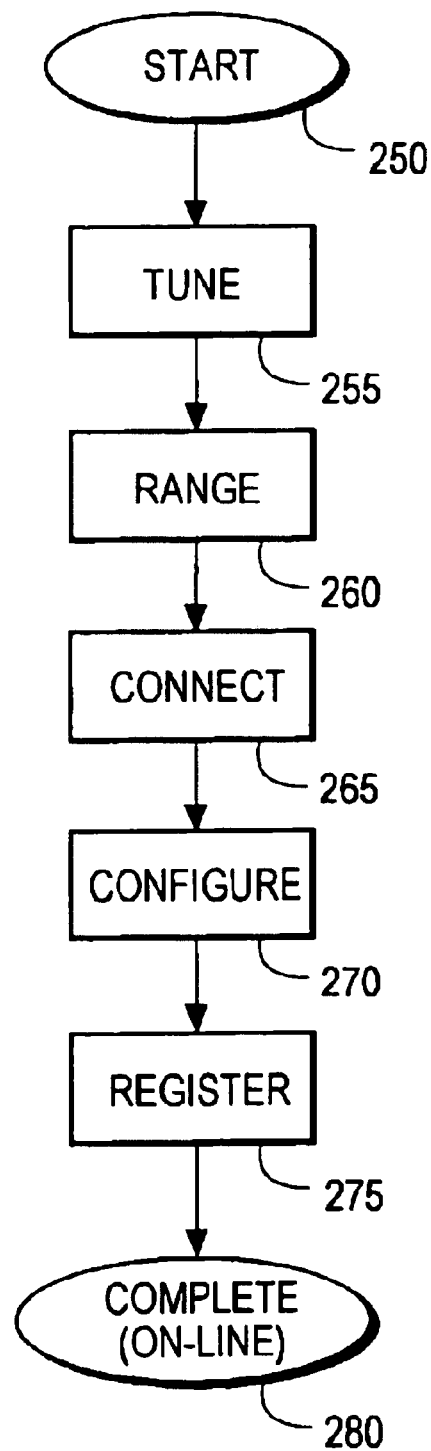
FIG. 2 presents a flowchart and description of operation of the FIG. 1 system during initialization, according to the invention.

Controller 60 employs the process shown in FIG. 2 for initializing the system of FIG. 1 and employs the visual indication system of FIG. 3 for displaying the corresponding modem status associated with the modem initialization sequence of FIG. 2. Specifically, FIG. 2 shows a series of operational states through which the FIG. 1 DOCSIS compliant cable modem system 12 progresses during startup to become fully operational. Upon application of power to modem system 12 in step 250 of FIG. 2, controller 60 executes bootloader software uploaded from flash memory within unit 60 to set all modem components to their initial power on condition including setting status LEDs (item 89 of FIG. 1) to indicate a Tuning state as shown in state 300 of FIG. 3. In step 255 of FIG. 2, controller 60 (FIG. 1) directs system 12 in determining the RF channel frequency that tuner 15 is to be configured to receive by iteratively tuning to successive candidate RF channel frequencies until a DOCSIS compliant signal is obtained. Controller 60 recognizes a DOCSIS compliant signal on a candidate channel through the successful decode by MCNS interface processor 35 of the received data and through a correspondingly acceptable error rate for the decoded data. Upon successful completion of tuning, status LEDs 89 are set to a Ranging state as exemplified in state 305 of FIG. 3.

In step 260 of FIG. 2, controller 60 initiates Ranging by directing system 12 in transmitting data upstream to the CATV head-end using MCNS interface 35, amplifier 85 and RF transformer 87. This is done for a number of purposes including for adaptively and iteratively adjusting upstream and downstream communication parameters. These parameters include cable modem transmission power level and timing offset, for example. The CATV head-end determines when Ranging is completed and communicates that Ranging is terminated to system 12. At completion of Ranging, communication between system 12 and the CATV head-end involving Media Access Control (MAC) layer protocol is established. Upon successful completion of Ranging, status LEDs 89 are set to a Connecting state as shown in state 310 of FIG. 3.

In step 265 of FIG. 2, controller 60 initiates Connecting by directing system 12 in establishing bi-directional communication between modem system 12 and the CATV head-end involving DHCP (Dynamic Host Configuration Protocol) communication with a remote DHCP server. Specifically, the system 12 IP (Internet Protocol) address and other configuration parameters are acquired from the DHCP server and stored in memory within unit 60. Upon successful completion of the Connecting process, the cable modem is operable as an internet host, and has an assigned IP address and status LEDs 89 are set to a Configuring state as shown in state 315 of FIG. 3.

In step 270 of FIG. 2, controller 60 initiates Configuring by acquiring the date and time from a remote internet TIME server using internet TIME protocol and by downloading a Configuration File for modem system 12 from a remote TFTP (Trivial File Transfer Protocol) server using TFTP. Upon completion of the Configuring operation, modem system 12 has received and stored sufficient information to become operational and is in condition to receive a signal from the CATV head-end to initiate becoming fully on-line and operational. Upon successful completion of Connecting, status LEDs 89 are set to a Registering state as shown in state 320 of FIG. 3.

In step 275 of FIG. 2, controller 60 initiates Registering by directing system 12 in communicating key configuration parameters applied by the modem system 12 to the CATV head-end for final acceptance. The CATV head-end compares the configuration parameters employed by system 12 with the configuration parameters previously supplied from the CATV head-end to system 12. Upon determining that they match, the CATV head-end notifies system 12 that registration is completed and that system 12 is on-line and operational and status LEDs 89 are set to indicate an on-line state as shown in state 325 of FIG. 3. The process of FIG. 2 is complete at step 280.

Figure 4:
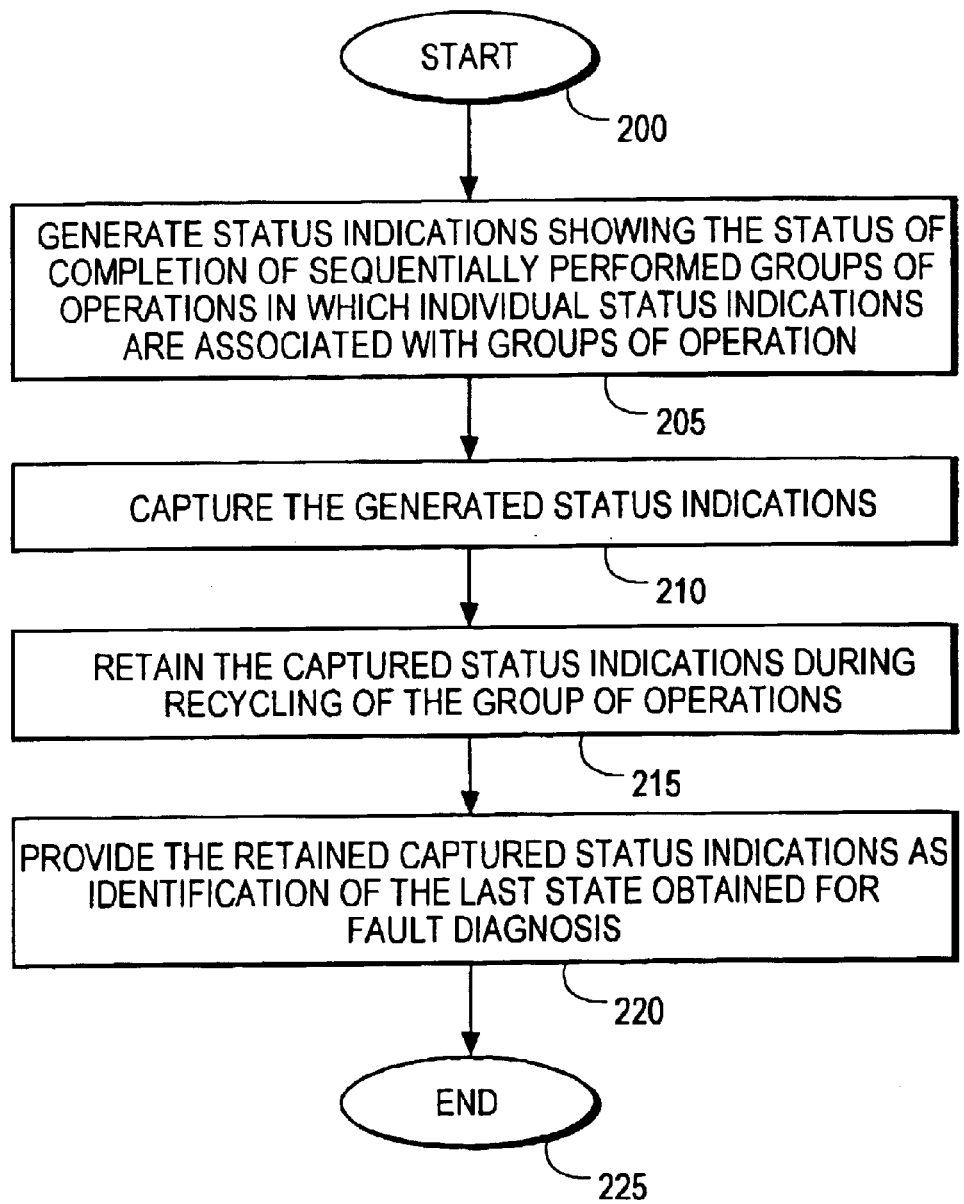
FIG. 4 shows a flowchart of a method for capturing system status upon an interruption condition as used by the cable modem of FIG. 1, according to the invention.

FIG. 4 shows a flowchart of a method employed by controller 60 and system 12 of FIG. 1 for capturing the system 12 initialization status upon an interruption condition. The DOCSIS specification requires that a cable modem automatically re-initialize if the modem fails to complete initialization. In addition, completing initialization may take a considerable amount of time under normal system conditions, e.g., it may take up to 10 minutes for current generation modems. Further, conventional LED (or other) status indicators that are re-cycled upon modem re-initialization lose their diagnostic information and fault detection value. As a result, such LED indicators (or other re-cycling indications) in a cable modem exhibiting trouble completing initialization may have to monitored by an installer for a long initialization period of time in order to discern how far into initialization the modem is progressing.

The system disclosed herein frees the installer to perform other work while a cable modem is initializing. Upon a cable modem initialization failure or other abnormal condition (and during re-initialization upon a failure prompted by a re-boot), the modem retains the status information including the Highest State Obtained for the last initialization process. An installer is then able to derive this status information from memory for troubleshooting purposes at his convenience.

These advantages are achieved by advantageously partitioning the total startup sequence of events mandated by DOCSIS into a discrete number of reportable states meaningful to an installer/technician. The operational status of these individual states is recorded and made available for user access. The initialization procedure is partitioned into discrete sequential states providing a sequential, cumulative indication of operational status through indicators (e.g. LEDs) associated with the states as exemplified in FIG. 3. The highest startup state that is reached during initialization is a valuable troubleshooting indicator for a cable modem unable to complete its startup procedure. Specifically, such an indication may enable a technician to quickly identify the internetworking system component that is preventing the modem's startup completion.

In the process of FIG. 4 and following the start at step 200, controller 60 (FIG. 1) in conjunction with system 12 in step 205, generates status indications visible on LED indicators 89. The indicators reflect the completion status of operations in the modem initialization sequence. Specifically, the operations are partitioned into discrete reportable groups of operations comprising the Tuning, Ranging, Connecting, Configuring and Registering groups of operations previously described in connection with FIGS. 2 and 3. Further each of the Tuning, Ranging, Connecting, Configuring and Registering groups of operations correspond to respective indicators that are meaningful to an installer/technician (as exemplified in FIG. 3). As an example, upon successful completion of Tuning, status LEDs 1 and 2 (of the five LEDs comprising LEDs 89) are set to flashing mode to indicate that the Tuning group of operations is complete and the Ranging group of operations is being performed, as exemplified in state 305 of FIG. 3. Although, the status monitoring system principles are described with reference to cable modem initialization functions, this is exemplary only. The status monitoring principles may be applied to any sequence of operations for fault diagnosis, general condition monitoring, or commanded test routines, for example and are not restricted in application to initialization functions.

Upon interruption of the initialization sequence of operations because of a fault or other condition, controller 60 in step 210 captures the status indications previously generated in step 205. An interruption condition may include, for example, either (a) a fault condition, (b) an abnormal operation condition or (c) a commanded interrupt condition. In a preferred embodiment, status indications identify the status of groups of operations being performed prior to interruption by a condition including at least one of (a) a fault condition, (b) an abnormal operation condition and (c) a commanded interruption condition. In step 215, controller 60 retains the captured status indications in internal memory (or removable memory module) during recycling of the initialization sequence which may be initiated automatically or upon a User command or other command. The retained status indications identify the highest operational state attained by system 12 prior to the interruption. As previously explained, this information is valuable, time saving diagnostic information useable by a technician for fault finding and component replacement.

In step 220, controller 60 provides the retained status indications for display on LED's 89 and also makes them available for other forms of access by a technician for system operation diagnosis. The status indications may alternatively be displayed as hierarchically ordered indications in the form of a visible progressive illuminated bar indicator or as non-LED illuminations or as an audible indication or another form of display. In a preferred embodiment, the status indications are displayed as hierarchically ordered visual indicators comprising at least one of (a) LED's, (b) a visible progressive illuminated bar indicator, (c) non-LED illuminations and (d) audible indications. The status indications identify the highest operational stat obtained by system 12 (as exemplified by the LED state identifications shown in FIG. 3) prior to an interruption condition. The status indications are displayed on LED's 89 in response to a User command such as activation of a switch (e.g., by selecting a third position on the power switch) or in response to an electronically communicated command from an attached PC or from the CATV head-end, for example. The status indications may also be derived from a removable memory module or may be electronically accessed via remote or local communication as hierarchically ordered fields of data indicators. The process of FIG. 4 terminates in step 225.

Figure 5:
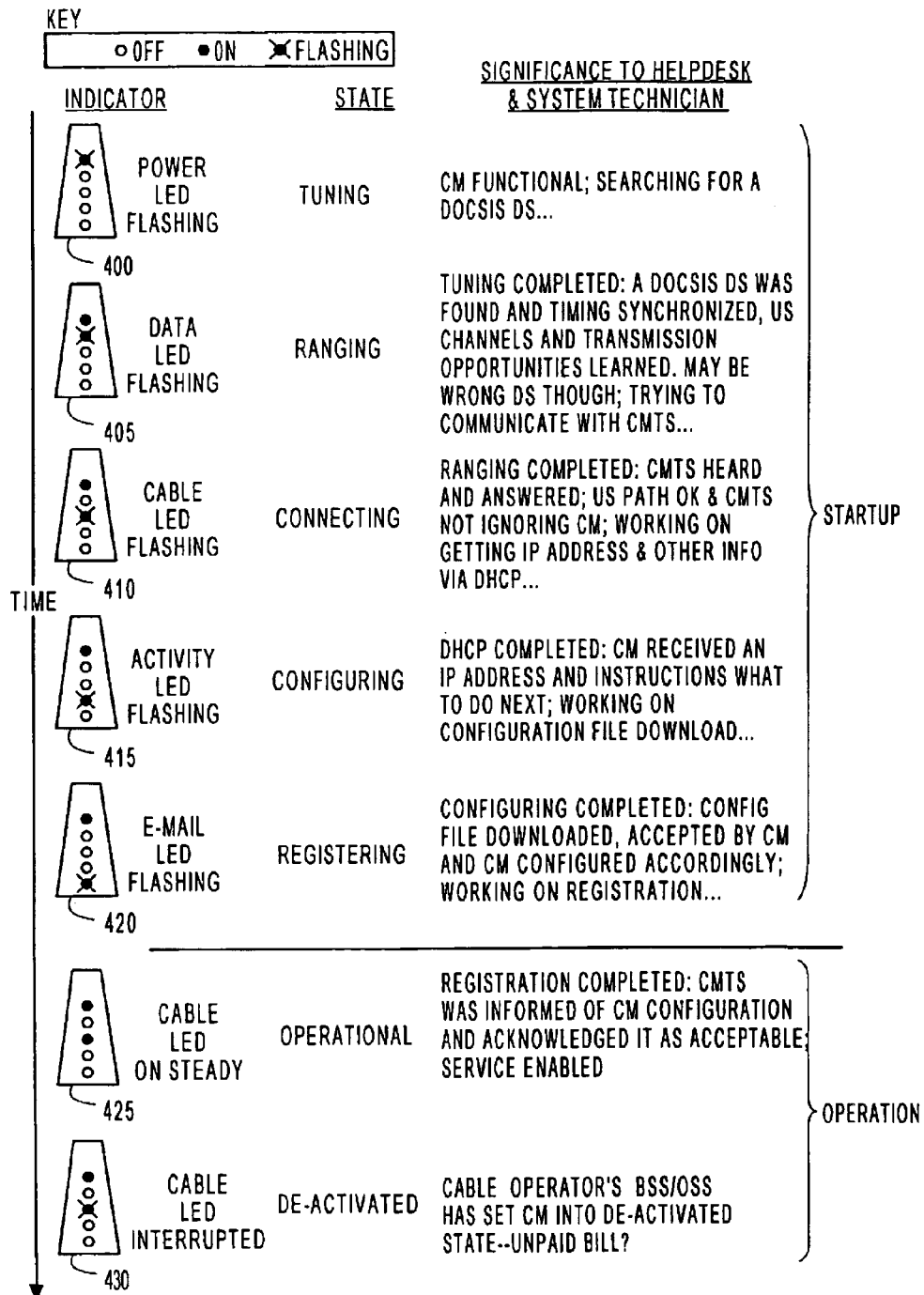
FIG. 5 shows another visual indication mechanism (alternative to the mechanism of FIG. 3) associated with a cable modem start up sequence, according to the invention.

FIG. 5 shows another visual indication mechanism (alternative to the mechanism of FIG. 3) associated with a system 12 start up sequence. The mechanism of FIG. 5 differs from the mechanism of FIG. 3 in the pattern of LEDs used to identify the sequential states. In other respects, the FIG. 5 groups of operations, Tuning 400, Ranging 405, Connecting 410, Configuring 415, Registering 420 and Operational state 425 correspond to equivalent states 300–325 of FIG. 3. However, FIG. 5 illustrates an additional Deactivated state 430 occurring when system 12 is deactivated by the CATV head-end in response to an unpaid bill, for example.

Figure 6:
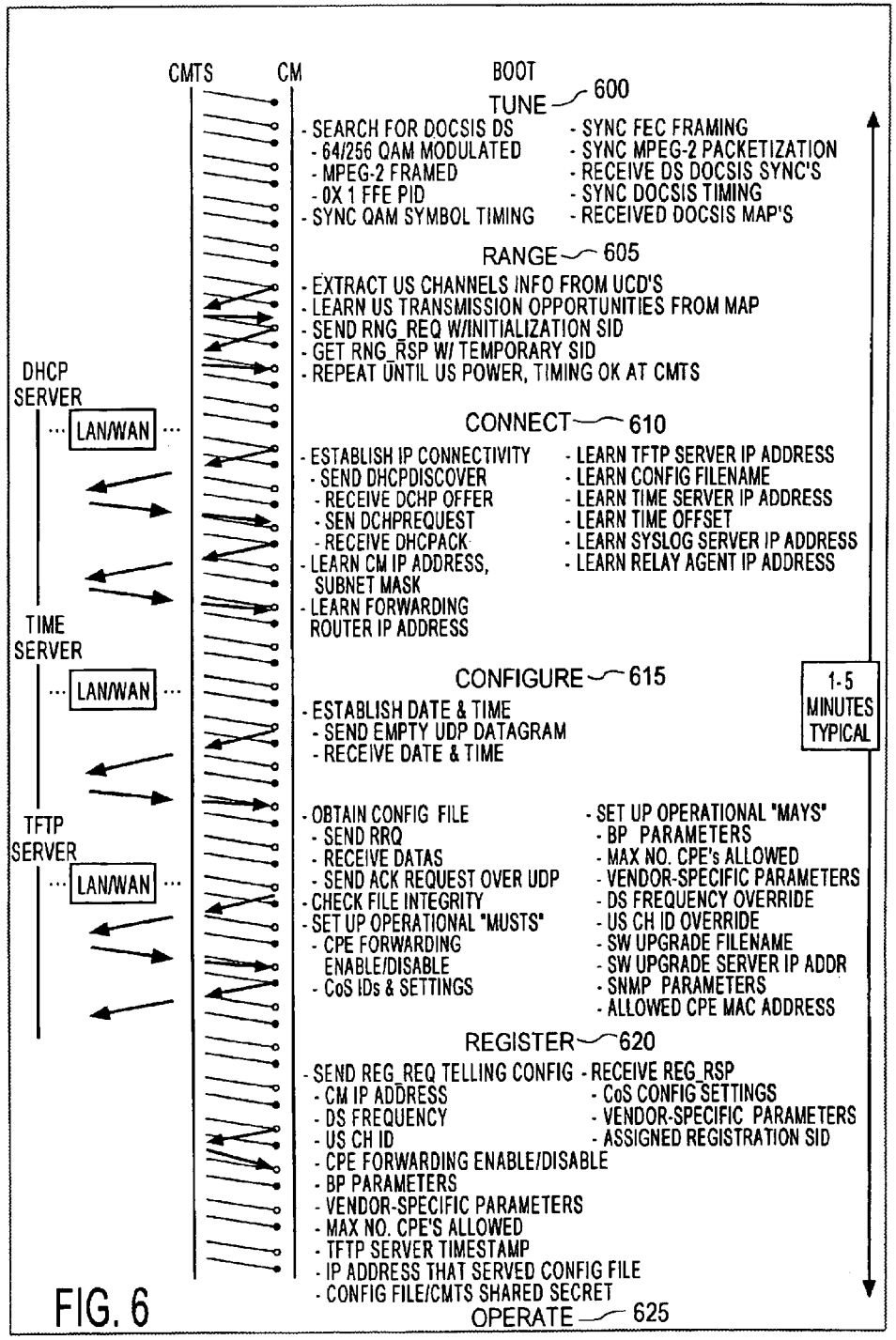
FIG. 6 shows additional communication processes and other operations involved in a cable modem start up sequence and associated with the status indication mechanism, according to the invention.

FIG. 6 details additional communication processes and other operations involved in the system 12 start up sequence. Specifically, FIG. 6 details further functions occurring within the Tuning 600, Ranging 605, Connecting 610, Configuring 615 and Registering 620 groups of operations previously more generally described in connection with FIGS. 2–5.

Returning to FIG. 1, following initialization and in normal operation, an RF carrier is modulated with MPEG2 transport protocol data using 64 or 256 QAM (Quadrature Amplitude Modulation). The MPEG2 transport data includes Ethernet formatted data which in turn includes IP data representing a User requested HTRL (HyperText Mark-Up Language) web page, for example. The MPEG transport data is provided by diplexer 20 to tuner 15. Tuner 15 down-converts the input signal from diplexer 20 to a lower frequency band which is filtered by saw filter 25 to enhance signal isolation from neighboring RF channels. The filtered signal from unit 25 is level shifted and buffered by differential amplifier 30 to provide a signal compatible with MCNS interface processor 35. The resultant down converted, level-shifted signal from amplifier 30 is demodulated by MCNS processor 35. This demodulated data is further trellis decoded, mapped into byte aligned data segments, deinterleaved and Reed-Solomon error corrected within processor 35. Trellis decoding, deinterleaving and Reed-Solomon error correction are known functions described, for example, in the reference text *Digital Communication*, Lee and Messerschmidt (Kluwer Academic Press, Boston, Mass., USA, 1988). Processor 35 further converts the MPEG2 format data to Ethernet data frames that are provided to controller 60.

Controller 60 parses and filters the Ethernet compatible data from unit 35 using filters configured from the CATV head-end. The filters implemented by controller 60 match data identifiers in incoming Ethernet frame packets provided by unit 35 with identifier values pre-loaded from the CATV head-end. The identifier values are pre-loaded during the previously performed initialization operation described in connection with FIG. 2. The filtered Ethernet compatible serial data is communicated to a PC via Ethernet interface 65, filter and isolation transformer 70 and port 72. Interface 65 buffers and conditions the data from controller 60 for filtering and transforming by unit 70 for output to a PC via port 72.

In similar fashion, controller 60 converts and filters data (conveyed in Ethernet MAC frames) from processor 35 for output in USB format via port 82 or in HPNA format via port 77. The USB data is buffered by transceiver 75 and filtered by noise and interference suppression (EMI/ESD) filter 80 prior to output to USB compatible LAN devices connected to port 82. Similarly, the HPNA data is conditioned by interface 62 and buffered by transceiver amplifier 67 prior to output to HPNA compatible LAN devices connected to port 77.

Modem system 12 also communicates data upstream from an attached PC, for example, to a CATV head-end. For this purpose, controller 60 of system 12 receives Ethernet compatible data from the attached PC via port 72, interface 65 and filter/isolation transformer 70 and provides it to processor 35. Processor 35 modulates an RF carrier with the received Ethernet format data using 16 QAM or QPSK (Quadrature Phase Shift Keying Modulation). The resultant modulated data is time division multiplexed onto cable line 10 for upstream communication via amplifier 85, transformer 87 and diplexer 20. Amplifier 85 outputs the data to the CATV head-end with an appropriate power level selected in the previously described initialization process. Transformer 87 provides a degree of fault and noise isolation in the event of a failure in the modem 12 or upon the occurrence of locally generated noise in the modem or in attached devices.

In similar fashion, modem system 12 also communicates data upstream from devices attached via USB port 82 or via HPNA port 77. In an exemplary implementation, controller 60 of system 12 receives Ethernet compatible data from transceiver 75 and provides it to processor 35 for upstream communication in the manner previously described. For this purpose, transceiver 75 receives Ethernet data encapsulated within USB frames from port 82 via filter 80 and removes the USB frame data to provide Ethernet format data to controller 60. Similarly, interface 62 receives data encapsulated in HPNA format from port 77 via transceiver 67 and provides Ethernet format data to controller 60.

Controller 60 is also responsive to on/off and reset switch 90 and performs a variety of functions in addition to those already described. These functions include displaying retained status indications on LEDs 89 following recycling of an initialization sequence upon an interrupt condition. This is done in response to User selection of a third position on power switch 90. Further, controller 60 configures modem 12 parameters using configuration information provided from a CATV head-end. Controller 60 also directs system 12 in synchronizing and multiplexing upstream communication onto cable line 10 and implements a rate limit in controlling upstream data traffic. Further, controller 60 bi-directionally filters received data and provides selected data to either the CATV head-end or LAN devices attached to ports 72, 77 and 82. Controller 60 also supports polling communication with the CATV head-end. The polling communication is initiated by the CATV head-end and comprises continuous but intermittent communication with individual modems to determine status and to identify modem or line failures.

The architecture of the system of FIG. 1 is not exclusive. Other architectures may be derived in accordance with the principles of the invention to accomplish the same objectives. Further, the functions of the elements of the cable modem system 12 and the process steps of FIG. 4 may be implemented in whole or in part within the programmed instructions of controller 60. In addition, the principles of the invention may be applied to provide a technician friendly status monitoring and condition diagnosis system for any system employing distinctly identifiable sequential operations.

What is claimed is:

1. In a bi-directional communication system performing a sequence of operations including groups of one or more individual operations having an associated status indication, a method for capturing indication of system status, comprising the steps of:

generating ordered status indications reflecting the status of completion of sequentially performed groups of operations wherein individual status indications are associated with corresponding groups of operations;

capturing said generated status indications;

retaining said captured status indications following initiation of repetition of said groups of operations; and providing said retained captured status indications as identification of an attained operational status of said system for system operation diagnosis, wherein said groups of operations include at least two different operations from operations including (a) tuning, (b) ranging, (c) configuring, and (d) registering.

2. A method according to claim 1, wherein said bi-directional communication system is a cable modem, said generating step generates hierarchically ordered status indications, and said sequentially performed groups of operations comprise at least one of (a) an initialization procedure of said cable modem system, (b) a fault diagnosis procedure of said cable modem system and (c) an abnormal condition monitoring procedure of said cable modem system.

3. A method according to claim 1, wherein said status indications identify the status of groups of operations being performed prior to interruption by a condition including at least one of (a) a fault condition, (b) an abnormal operation condition and (c) a commanded interruption condition.

4. A method according to claim 1, wherein said captured status indications identify the highest operational state reached in initialization of said system prior to an interruption and are provided in response to a User command.

5. A method according to claim 1, wherein said User command comprises selection of a power switch setting.

6. A method according to claim 1, wherein said capturing status indications are usable in combination for fault finding and problem diagnosis by a technician.

7. A method according to claim 1, wherein said providing step comprises at least one of (a) displaying said retained captured status indications to a User of said system, and (b) maintaining said retained captured status indications in memory accessible by a User of said system.

8. A method according to claim 7, wherein said providing step comprises retaining said captured status indications during re-cycling of said sequentially performed groups of operations.

9. A method according to claim 1, wherein said providing step comprises displaying said retained captured status indications as hierarchically ordered visual indicators comprising at least one of (a) LED's, (b) a visible progressive illuminated bar indicator, (c) non-LED illuminations and (d) audible indications.

10. A method according to claim 1, wherein said providing step comprises maintaining said retained captured status indications in a removable storage medium to be available during re-cycling of said sequentially performed groups of operations.

11. A method according to claim 1, wherein said providing step comprises providing via remote access communication said retained captured status indications as hierarchically ordered fields of data indicators.

12. In a modem system performing an initialization procedure comprising a sequence of operations including groups of one or more individual operations having an associated status indication, a method for capturing indication of system status, comprising the steps of:

generating hierarchically ordered status indications reflecting the status if completion of sequentially performed groups of operations wherein individual status indications are associated with corresponding groups of operations and identify the status of groups of operations being performed prior to interruption by a condition including at least one of (a) a fault condition, (b) an abnormal operation condition and (c) a commanded interruption condition;

capturing said generated status indications;

retaining said captured status indications following initiation of repetition of said groups of operations; and providing said retained captured status indications as identification of an attained operational status of said system for system operation diagnosis, wherein said groups of operations include at least two different operations from operations including (a) tuning, (b) ranging, (c) configuring, and (d) registering.

13. A method according to claim 12, wherein said sequentially performed groups of operations comprise at least one of (a) an initialization procedure of said modem system, (b) a fault diagnosis procedure of said modem system and (c) an abnormal condition monitoring procedure of said modem system.

14. A method according to claim 12, wherein said captured status indications identify the highest operational stated reached in initialization of said system.

15. A method according to claim 12, wherein said captured status indications are useable in combination for fault finding and problem diagnosis by a technician.

16. A method according to claim 12, wherein said captured status indications identify the highest operational state reached in initialization of said system prior to an interruption and are provided in response to a User command.

17. In a modem system performing an initialization procedure comprising a sequence of operations including groups of one or more individual operations having an associated status indication, a method for capturing indication of system status, comprising the steps of:

generating hierarchically ordered status indications reflecting the status of completion of sequentially performed groups of operations partitioned into a hierarchical sequence of operational levels with individual levels including one or more of (a) tuning, (b) ranging (c) configuring and (d) registering operations and having a corresponding status indication;

capturing said generated status indications;

retaining said captured status indications following initiation of repetition of said groups of operations; and providing said retained captured status indications as identification of an attained operational status of said system for system operation diagnosis.

18. A method according to claim 17, wherein said sequentially performed groups of operations comprise at least one of (a) an initialization procedure of said modem system, (b) a fault diagnosis procedure of said modem system and (c) an abnormal condition monitoring procedure of said modem system.

19. A method according to claim 17, wherein said captured status indications identify the highest operational state reached in initialization of said system.

* * * * *